(12) United States Patent
Mohr et al.

(10) Patent No.: US 9,818,200 B2
(45) Date of Patent: Nov. 14, 2017

(54) APPARATUS AND METHOD FOR MULTI-ATLAS BASED SEGMENTATION OF MEDICAL IMAGE DATA

(71) Applicant: Toshiba Medical Systems Corporation, Otawara-shi (JP)

(72) Inventors: Brian Mohr, Edinburgh (GB); Ian Poole, Edinburgh (GB)

(73) Assignee: Toshiba Medical Systems Corporation, Otawara-shi (JP)

( * ) Notice: Subject to any disclaimer, the term of this patent is extended or adjusted under 35 U.S.C. 154(b) by 77 days.

(21) Appl. No.: 14/079,908

(22) Filed: Nov. 14, 2013

(65) Prior Publication Data

US 2015/0131882 A1    May 14, 2015

(51) Int. Cl.
```
G06K 9/00       (2006.01)
G06T 7/00       (2017.01)
G06T 7/11       (2017.01)
G06T 7/174      (2017.01)
```

(52) U.S. Cl.
CPC .......... *G06T 7/0081* (2013.01); *G06T 7/11* (2017.01); *G06T 7/174* (2017.01); *G06T 2207/10081* (2013.01); *G06T 2207/10088* (2013.01); *G06T 2207/10104* (2013.01); *G06T 2207/10136* (2013.01); *G06T 2207/20128* (2013.01); *G06T 2207/30008* (2013.01); *G06T 2207/30016* (2013.01); *G06T 2207/30101* (2013.01)

(58) Field of Classification Search
None
See application file for complete search history.

(56) References Cited

U.S. PATENT DOCUMENTS

| 8,160,357 | B2 * | 4/2012 | Akinyemi et al. ............ 382/173 |
| 9,053,541 | B2 * | 6/2015 | Piper et al. |
| 2010/0260396 | A1 * | 10/2010 | Brandt ................. G06K 9/4671 382/131 |
| 2012/0027272 | A1 * | 2/2012 | Akinyemi ............ G06T 7/0081 382/128 |
| 2012/0035463 | A1 | 2/2012 | Pekar et al. |
| 2012/0163687 | A1 * | 6/2012 | Plakas et al. ................. 382/131 |

(Continued)

FOREIGN PATENT DOCUMENTS

| JP | 2004-222864 | 8/2004 |
| JP | 2008-43736 | 2/2008 |

OTHER PUBLICATIONS

Langerak, T. R., Berendsen, F. F., Van der Heide, U. A., Kotte, A. N., & Pluim, J. P. (2013). Multiatlas-based segmentation with preregistration atlas selection. Medical physics, 40(9), 091701, 8 pages.*

(Continued)

*Primary Examiner* — Vu Le
*Assistant Examiner* — Samah Beg
(74) *Attorney, Agent, or Firm* — Oblon, McClelland, Maier & Neustadt, L.L.P.

(57) ABSTRACT

An image data processing apparatus including a data receiver receiving image data to be segmented, and an atlas selection processor accessing a plurality of atlas data sets and selecting a subset of the atlas data sets for use in segmenting the image data, wherein the atlas selection processor is configured to select the subset of atlas data sets in dependence on the positions of one or more anatomical landmarks comprised in the plurality of atlas data sets.

16 Claims, 3 Drawing Sheets

(56) References Cited

U.S. PATENT DOCUMENTS

| | | |
|---|---|---|
| 2012/0306934 A1 | 12/2012 | Ohashi et al. |
| 2013/0002677 A1 | 1/2013 | Hatanaka et al. |
| 2013/0034203 A1* | 2/2013 | Wang et al. .............. 378/41 |
| 2013/0039550 A1* | 2/2013 | Blum et al. ............. 382/128 |
| 2013/0044927 A1* | 2/2013 | Poole ..................... 382/131 |
| 2015/0023575 A1* | 1/2015 | Valadez et al. ......... 382/131 |
| 2015/0178938 A1* | 6/2015 | Gorman, III ....... G06T 7/0087 382/131 |

OTHER PUBLICATIONS

Langerak, Thomas Robin, et al. "Label fusion in atlas-based segmentation using a selective and iterative method for performance level estimation (SIMPLE)." IEEE Transactions on Medical Imaging 29.12 (2010): 2000-2008.*

Alven, J., Norlén, A., Enqvist, O., & Kahl, F. (2016). Überatlas: fast and robust registration for multi-atlas segmentation. Pattern Recognition Letters,80, 249-255.*

P. Aljabar, et al., "Multi-atlas based segmentation of brain images: Atlas selection and its effect on accuracy", NeuroImage 46, 2009, 13 pages.

Annemie Ribbens, et al., "SPARC: Unified Framework for Automatic Segmentation, Probabilistic Atlas Construction, Registration and Clustering of Brain MR Images", IEEE ISBI, 2010, 4 pages.

Mert R. Sabuncu, et al., "Joint Registration and Clustering of Images", Statistical Registration Workshop: MICCAI, 2007, 8 pages.

Qian Wang, et al., "Groupwise Registration Based on Hierarchical Image Clustering and Atlas Synthesis", Human Brain Mapping, Aug. 31, 2010, 13 pages.

J. Ashburner, et al., "Multimodal Image Coregistration and Partitioning—A Unified Framework", NeuroImage 6, 1997, 9 pages.

Simon K. Warfield, et al., "Simultaneous Truth and Performance Level (STAPLE): An Algorithm for the Validation of Image Segmentation", IEEE Transactions on Medical Imaging, vol. 23, No. 7, Jul. 2004, 19 pages.

Jia, H., Absorb: Atlas Building by Self-Organized Registration and Bundling, NeuroImage, vol. 51, pp. 1057-1070, (2010).

Shi, F., Construction of Multi-Region-Reference Atlases for Neonatal Brain MRI Segmentation, NeuroImage, vol. 51, pp. 684-693, 2010.

* cited by examiner

APPARATUS AND METHOD FOR MULTI-ATLAS BASED SEGMENTATION OF MEDICAL IMAGE DATA

FIELD

Embodiments described herein relate generally to medical image data processing apparatus and methods, such as apparatus and methods that provide multi-atlas segmentation of medical images.

BACKGROUND

Modern medical imaging techniques often require the generation and analysis of a large number of 2D, 3D and 4D images from data collected by medical imaging devices. Such images can be generated using a variety of medical imaging methods or modalities such as, but not limited to, CT, MRI, CT, PET, ultrasound imaging and the like.

Three-dimensional (3D) medical images can be generated using software to combine measurement data that has been taken at different positions or angles, and to render an image from the combined data using methods such as simple surface shading or direct volume rendering. In four-dimensional (4D) imaging systems, a series of three-dimensional images obtained at different times is dynamically rendered to produce a moving 3D image, for example, a 3D ultrasound movie.

In many instances, it may be beneficial to partition a medical image into one or more segments, where each segment corresponds to, for example, a particular tissue type, organ or organ sub-component, vessel, bone or portion of bone, or other biological structure. Segmentation can be performed manually or by using one of various available automated techniques.

It is known to create atlases of the human anatomy, or particular parts of the human anatomy, which can be used in the processing or analysis of image data of a patient. Usually, particular anatomical features identified from the image data are matched to the atlas in a registration procedure. A rigid or non-rigid transformation can be applied to the image data so that the positions of particular anatomical features in the image data are aligned with positions for those features defined by the atlas. The use of such atlases and registration procedures enables, for example, direct comparisons to be performed between image data obtained from different subjects.

Known atlases may comprise, for example image data in the form of a set of pixels or voxels, and segmentation data that represents a segmentation of the image data into different anatomical regions or types of anatomical or other material (for example, particular tissue types, bone, blood). By way of example, the segmentation data can be in the form of a bit mask, but other forms of segmentation data are known. Each pixel or voxel may comprise, for example, an image intensity value or other image parameter value at a particular position within a co-ordinate system of the atlas. The image data and segmentation can be stored separately, for example as different entries in one or more databases, but linked. The image data and/or segmentation data can be referred to as an atlas data set regardless of whether they are stored separately or together.

One technique for carrying out automated segmentation is atlas-based segmentation. This technique usually uses labeled or segmented data sets as atlas data sets against which image data can be compared in order to determine the appropriate segmentation or labeling. Such techniques generally require registration of collected image data in order to align it with the atlas data sets.

Figure 1:
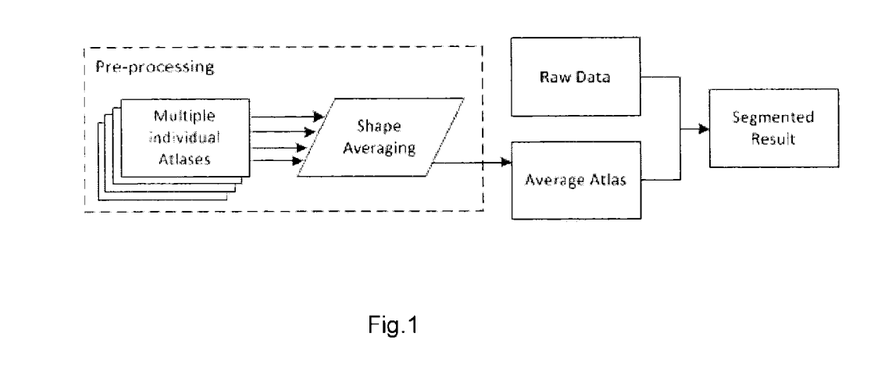
FIG. 1 shows a flow chart of an atlas-based segmentation procedure using multiple atlases.
Figure 2:
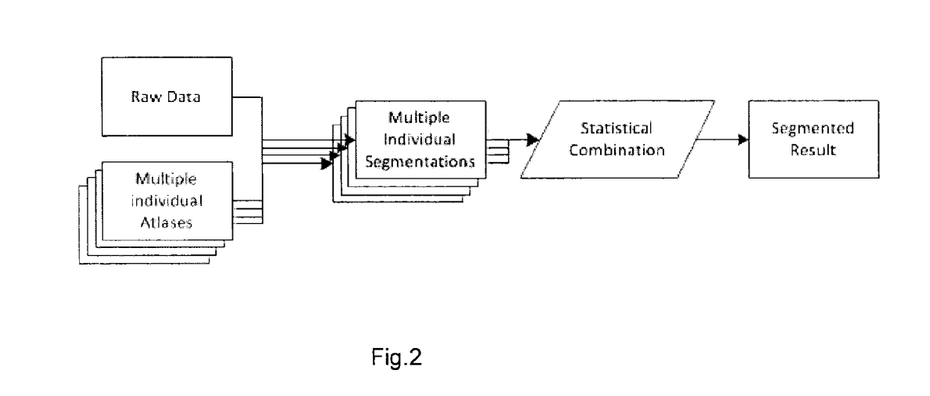
FIG. 2 shows a flow chart of an alternative atlas-based segmentation procedure using multiple atlases.

Improved results can be achieved if multiple atlases are used in the atlas-based segmentation. In one possible implementation of this technique, as illustrated in overview in the flowchart of FIG. 1, multiple atlases can be registered with each other and combined into a single averaged atlas against which the image can be registered and compared in order to segment the image. In another possible implementation of atlas-based segmentation using multiple atlases, as illustrated in overview in the flowchart of FIG. 2, the image can be registered and compared against each of a plurality of atlases, thereby producing multiple segmentations of the image, wherein each segmentation is produced using a different atlas. The multiple segmentations can then be combined, e.g. using statistical combination, in order to produce the final segmented image.

In the latter case, where the image is registered to each atlas separately and the results combined, the end results are often improved when a larger number of atlases are used, which may include a larger number of anatomical variations. However, in such cases, the processing demands are often onerous and the time required to perform such calculations can become prohibitively long.

BRIEF DESCRIPTION OF THE DRAWINGS

Embodiments are now described, by way of non-limiting example, and are illustrated in the following figures, in which.

DETAILED DESCRIPTION

According to embodiments there is provided an image data processing apparatus comprising a data receiving unit for receiving image data to be segmented, and an atlas selection unit for accessing a plurality of atlas data sets and selecting a subset of the atlas data sets for use in segmenting the image data to be segmented, wherein the atlas selection unit is configured to select the subset of atlas data sets in dependence on the positions of one or more anatomical landmarks comprised in the plurality of atlas data sets.

In some embodiments, the atlas selection unit may be configured to perform a first registration between the plurality of atlases and the image data to be segmented using a first registration method. The segmentation unit may be configured to perform a second registration between the subset of atlases and the image data to be segmented using a second registration method that differs from the first registration method.

The first registration may comprise a less computationally intensive registration method than that used for the second registration. The first registration may comprise a rigid registration. The second registration may comprise a non-rigid registration.

The selection unit may be configured to transform the positions of the landmarks in accordance with the first registration into the co-ordinate system of the image data to be segmented, and selection of the subset of atlas data sets is in dependence on the transformed position of the anatomical landmarks.

The atlas selection unit may be configured to compute a distance metric representative of a distance between anatomical landmarks from different atlas data sets; and select the subset of atlases based on the distance metric. The atlas selection unit may be configured to select the subset of atlas data sets by identifying atlas data sets that have the most similar distance metric. Computing the distance metric may comprise determining a mean of the distance between positions of corresponding landmarks from different atlas data sets. The distance metric may be representative of a distance between anatomical landmarks. For each of the anatomical landmarks the distance metric is computed in a common co-ordinate system, for example the co-ordinate system of the image data to be segmented. The position of the landmarks may be the position of the landmarks in the co-ordinate system of the image data to be segmented.

The atlas selection unit may be configured to select the subset of atlas data sets using a clustering method. The clustering method may comprise hierarchical clustering or spectral clustering, or any other suitable clustering method. The clustering method may comprise identifying a largest cluster for a given distance or identifying the first cluster to contain a given or preset number of atlases.

The clustering method may comprise an iterative clustering method that comprises grouping two or more atlases having the most similar distance metric at each iteration.

The apparatus may further comprise a segmentation unit for segmenting the image data to be segmented using the selected subset of atlases to produce segmented image data.

Embodiments may also provide a method of image data processing comprising: receiving image data to be segmented, accessing a plurality of atlas datasets for use in segmenting the image data to be segmented, and selecting a subset of the atlas data sets for use in segmenting the image data to be segmented, wherein the selecting of the subset of the atlas data sets comprises selecting the subset of atlas data sets in dependence on the positions of one or more anatomical landmarks comprised in the plurality of atlas data sets.

Medical image processing apparatus according to embodiments of the invention can take various forms. For example, the medical image processing apparatus can be incorporated into a medical imaging device that produces medical images or can be comprised in a separate processing apparatus that receives medical image data produced by a separate medical imaging device, for example, over a network or on a computer readable medium or the like. In addition, medical imaging processing apparatus according to embodiments of the present invention can be operable with medical images produced using a range of modalities including ultrasound, MRI, conventional x-ray, computerised tomography (CT scanner), positron emission tomography (PET scanner) and the like. As such, the present invention is not limited to a particular configuration or imaging technique but can be broadly applicable to a range of medical image processing system configurations and modalities.

Figure 3:
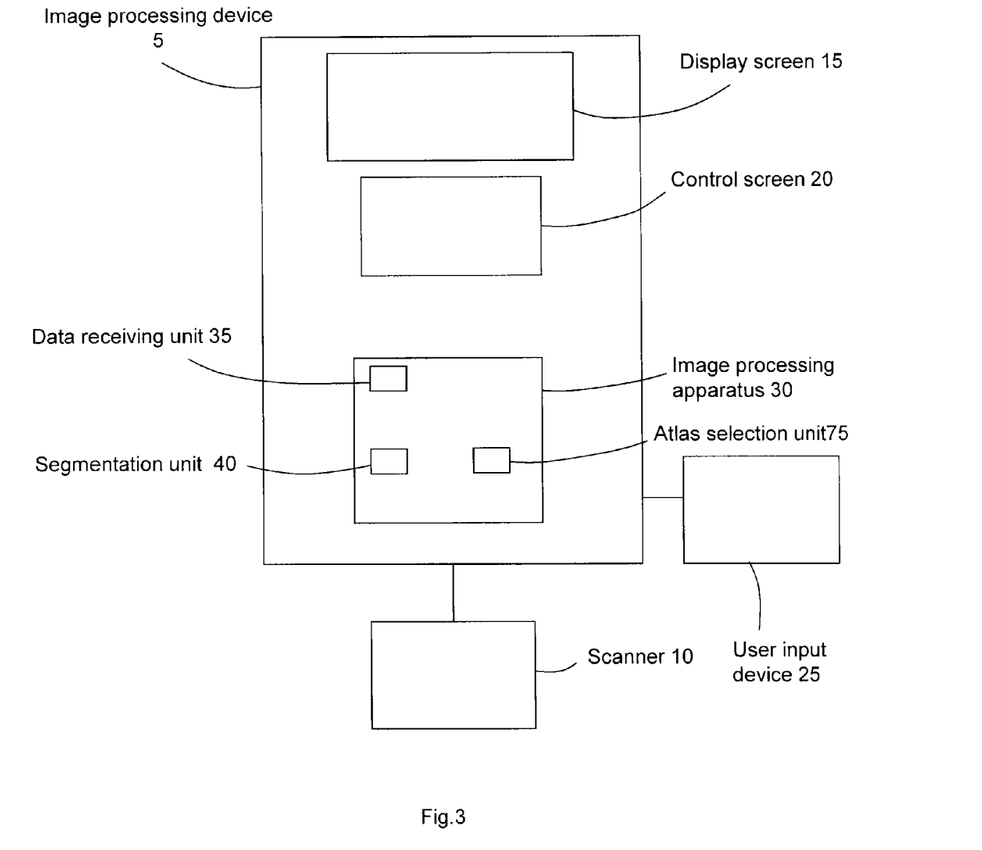
FIG. 3 shows a medical image data processing apparatus according to an embodiment.

A medical image processing apparatus according to an embodiment of the present invention is illustrated in FIG. 3. In this case, the medical image processing apparatus is comprised in an integrated medical imaging and image processing device 5.

The integrated medical imaging and image processing device 5 is connected to a CT scanner 10. Any suitable type of CT scanner may be used that is able to perform three dimensional CT measurements on a patient or other subject, for example one of the Aquilion® series of scanners produced by Toshiba Medical Systems Corporation. Although the embodiment of FIG. 3 is described in relation to CT scan data, any other suitable type of scanner or other imaging apparatus producing any suitable type of image data according to any suitable modality may be used in alternative embodiments, for example an x-ray, MRI, PET, CT, or ultrasound scanner or other apparatus.

The medical imaging and processing device 5 further comprises a main display screen 15 for displaying a medical image and a touch sensitive control screen 20 forming part of a control panel. The scanner also comprises one or more other user input devices 25 known in the art such as a trackball, a keyboard, a joystick, a mouse and the like.

The medical imaging and processing device 5 comprises image processing apparatus 30 for processing data, including image data to be segmented that is generated using the CT scanner 10. The processing apparatus 30 includes or is in communication with or implements one or more components such as a hard drive, RAM, ROM, a data bus, an operating system including various device drivers, and hardware devices including a graphics card. Such components are not shown in FIG. 3 for clarity.

As shown in FIG. 3, the processing apparatus 30 comprises a data receiving unit 35 for receiving the image data to be segmented. In the present embodiment, the data receiving unit receives image data collected using the CT scanner 10, wherein the image data to be segmented comprises CT data representative of at least part of one or more subjects or objects that are located in an imaging volume that is being or has been imaged using the scanner 10. It will be appreciated that the image data can be received and/or processed in real time or received from a suitable data store for processing at a suitable time. The image data may be any data that is representative of an image and/or that can be processed in order to produce an image.

The processing apparatus 30 is configured to segment the image data using a multi-atlas segmentation process. In particular, the processing apparatus 30 implements an atlas selection unit 75 for selecting a subset of a set of available atlases for use in the segmentation process and a segmentation unit 40 for segmenting images of the imaged subjects or objects represented by the image data.

The segmentation unit 40 identifies parts of the image data to be segmented that correspond to a given criteria. For example, the segmentation unit 40 may be configured to identify parts of the image data that represent a particular tissue type, organ or organ sub-component, vessel, bone or portion of bone or other anatomical structure. In this way, the segmentation unit 40 is configured to provide automated segmentation of the image data into segments corresponding to different criteria, for example, relating to identified tissue types, organs or organ sub-components, vessels, bones or portions of bone or other biological structures. Once the segmentation unit 40 has identified the relevant segments, the segmentation unit may be operable, for example, to highlight one or more of the segments in the image data, for example by using annotating, recolouring, highlighting, outlining, contrast or brightness alteration or the like. The annotated or modified image data can then be displayed, for example, on the screen 15, so that the different segments can be easily identified. Alternatively or additionally, the segmentation unit 40 may provide the segmented image data, or data representative of the segmentation, as an input to other image processes, or to diagnostic or other processes.

Although the embodiment of FIG. 3 comprises an integrated medical imaging and image processing apparatus 5, in alternative embodiments the medical image processing device 30 may be provided as a separate computing device, for example a PC or workstation. The data receiving unit 35 may comprise a network interface and/or a device for accessing computer readable medium, for example.

If the image collection device is connected to a network then the image data to be segmented and any associated data can be communicated over the network to the processing apparatus 30. It will be appreciated that the image data and associated data need not be directly communicated to the processing apparatus 30 but may instead be stored in a data store, such as a local data store that is part of or connected to the medical image collection apparatus, a networked data store, a data store comprised in or connected to or accessible by a server, a remote data store accessed through the internet, an ISP, or the like or a local data store comprised in or connected to the processing apparatus 30. The data stores may comprise any suitable data storage mechanism such as a hard drive or bank of hard drives, a solid state storage device or solid state drive, magnetic storage such as a tape drive or the like. Alternatively or additionally, the image data and any associated data can be transferred using computer readable medium in a manner known in the art.

Each data store may store a large number of different data sets obtained from many different scanners over a period of time together with associated patient data. A data store may be a server that stores a large quantity of patient data, and may form part of a Picture Archiving and Communication System (PACS), for example the Toshiba Rapideye® system.

Once the image data to be segmented has been obtained, the segmentation unit 40 is operable to analyse the image data and determine areas of the image data that correspond to a given criteria, such as belonging to a same tissue type, organ or organ sub-component, vessel, bone or portion of bone or other biological structure. The segmentation unit 40 may then be operable to produce an annotated or modified image from the image data, wherein the modified image may be segmented in order to highlight or display independently the areas associated with each of the criteria (e.g. to highlight the different tissue types, organs or organ sub-components, vessels, bones or portions of bone or other biological structures or the like). It will be appreciated that the segmentation unit 40 is operable to perform the segmentation of the image data in an automated or semi-automated manner, which can be in real time or from previously collected and stored data.

Specifically, the processing apparatus 30 is configured to implement an atlas-based segmentation technique that uses a plurality of atlases, i.e. a multi-atlas based segmentation. In particular, the processing apparatus 30 is configured to register against each of a plurality of atlases the image data to be segmented in order to generate a corresponding plurality of registrations and then statistically combine the plurality of registrations. It has been found that this approach can give better results than techniques that involve registering the image against a single atlas. It has been found that the results of the segmentation process can be further improved when the number of atlases used increases or a larger number of anatomical variations can be reflected in the atlases. However, in such cases, the time required to carry out the segmentation can often be prohibitive.

One possible approach is to select a subset from the available atlas data sets. For example, a similarity metric such as mutual information could be used to select the sub-set of atlases to be used. As another example, heuristics derived from the associated patient data (such as age, sex, etc.) could be used. However, according to embodiments, alternative procedures by which optimal atlases are selected are provided.

Figure 4:
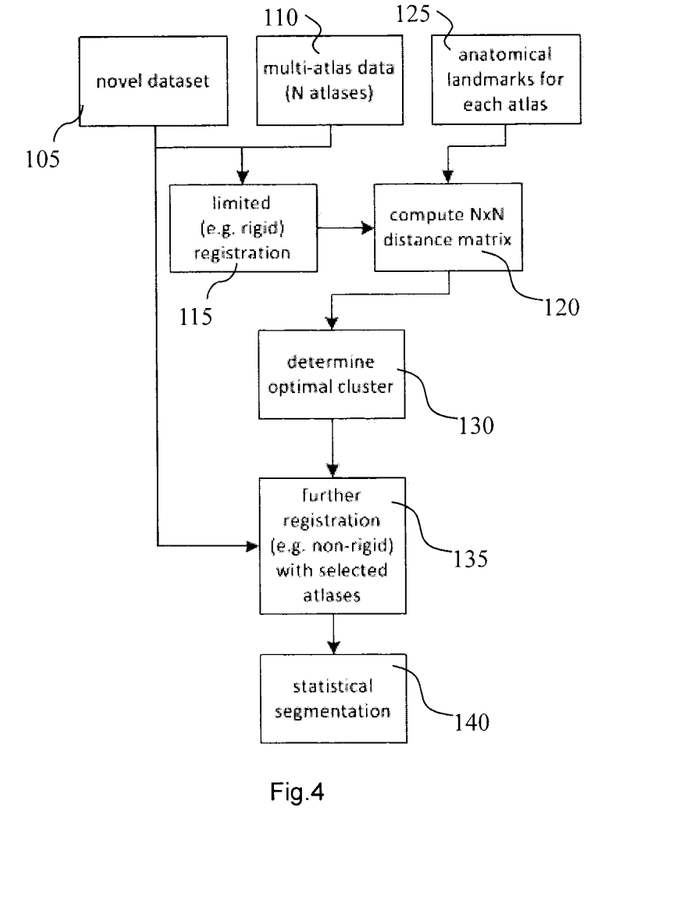
FIG. 4 is a flowchart illustrating in overview an atlas-based segmentation method using multiple atlases according to an embodiment.

The operation of the processing apparatus 30 according to embodiments of the present invention is illustrated in FIG. 4. As illustrated in step 105, the processing apparatus 30 receives a new dataset (i.e. the image data to be segmented) from the data receiving unit 35. As illustrated in step 110, the processing apparatus 30 according to embodiments comprises or implements the atlas selection unit 75 that is configured to store or access a plurality of atlas data sets, also referred to as atlases, and select a subset of those atlases for use in the segmentation process. The processing apparatus 30 also comprises or implements the segmentation unit 40 for segmenting the image data using the selected subset of atlases to produce segmented image data.

In embodiments, N atlases are provided (where N>1 and preferably much greater than 1), wherein the atlases comprise medical images of a body or part of a body that have been marked, annotated and/or provided with associated data (e.g. manually by an expert) that identifies anatomical landmarks and/or regions of the image corresponding to desired criteria, such as parts of the image showing particular tissue types, organs or organ sub-components, vessels, bones or portions of bone or other biological structures or the like. The anatomical landmarks may comprise points that can be used to differentiate between different pathologies or anatomical variations. In this way, the atlases are operable as reference data sets. Beneficially, the atlases available to the processing apparatus 30 include one or more atlases associated with one or more different pathologies.

The atlas selection unit 75 is configured to register each of the plurality of atlases against the image data to be segmented using a first registration method, as illustrated in step 115 of FIG. 4. In the embodiment of FIG. 4, the first registration method comprises performing a limited registration, for example one that has a lower computational overhead compared with a second registration method that will be described later. For example, the first registration method may use certain assumptions and/or simplifying processes and/or operate at a lower resolution in order to reduce the computational overhead.

Using rigid registration of the atlases to the image data to be segmented has been found to be particularly suitable as a first registration method. However, it will be appreciated that the first computational method need not comprise rigid registration and could instead comprise another suitable computationally efficient technique that might be apparent to a skilled person, for example another affine type of registration.

A rigid registration in this context may be considered to be a registration in which the co-ordinates of data points in one data set are subject to rotation, translation and/or scaling in order to register the data set to another data set. An affine registration in this context may be considered to be a registration in which the coordinates of data points in one dataset are subject to rotation, translation, scaling and/or shearing in order to register the dataset to another dataset. Thus, a rigid registration may be considered to be a particular type of affine registration.

The atlas selection unit 75 is then configured to transform the positions of the landmarks of each of the atlas data sets in accordance with the respective registration, and to compute a distance metric for each pair of atlases in the N provided atlases, as illustrated in step 120 of FIG. 4. For example, the atlas selection unit 75 is configured to retrieve anatomical landmarks from the N atlases (step 125), determine the positions of the anatomical landmarks from each atlas in the coordinate system of the image data to be segmented using the first registration method, and generate an N×N distance matrix M using distances (for example, mean pairwise Euclidean distances) between the determined positions of anatomical landmarks derived from pairs of different atlases from amongst the N atlases.

The atlas selection unit 75 is configured to determine which atlases agree most with the image data to be segmented (e.g. the new dataset). In embodiments, this comprises selecting those atlases having the most similar mean distance values between landmarks or lowest mutual distances for inclusion in the subset of atlases. One beneficial method of doing this is by using clustering, such as hierarchical clustering, to identify the atlases for inclusion in the subset of atlases (step 130).

In one example of a suitable hierarchical clustering technique, the atlas selection unit 75 assigns each atlas into a cluster of 1. The clustering then continues in an iterative manner wherein, at each iteration, the closest entries, i.e. those atlases having the closest distance metrics (e.g. mean distances between landmark pairs), are clustered together. In this way, entries for clustering together at each iteration are selected according to the similarity of the mean of the distance between corresponding landmark pairs. The iterative clustering method continues until the cluster with the lowest mutual distance has at least a preset or threshold minimum number of atlases. The preset or threshold minimum number can be selected to give an acceptable compromise between the calculation time and the segmentation quality.

Although an example is given above that uses a specific hierarchical clustering method, it will be appreciated that various techniques could be used to determine the sub-set of atlases. For example, the final cluster selection for the hierarchical clustering could be the largest cluster for a given distance or the first cluster to obtain a given number of atlases. Furthermore, spectral clustering techniques or other clustering techniques could be used instead of hierarchical clustering.

Once the sub-set of atlases has been determined then a second registration method is used by the segmentation unit 40 to perform a further registration (step 135) in which the sub-set of atlases are registered to the image data to be segmented. The second registration method comprises a full or higher resolution or accuracy registration method relative to the first registration method. For example, the second registration method may comprise a non-rigid registration, which may produce a dense deformation field. The results of the further registration may then be combined statistically as part of a statistical segmentation process in order to produce the final segmented image (step 140).

Non-rigid registrations can comprise free-form registrations, in which the coordinates of data points in one dataset are subject to a flexible, free-form transformation in order to register the dataset to another dataset. Freeform transformations may be defined as a dense vector field, defining an individual displacement for each voxel in a three-dimensional data set. Freeform transformations may also be defined using other fields or functions, for example using B spline functions or thin plate spline functions.

One advantage of the atlas selection method of the embodiment is that it does not depend on landmarks being marked or detected in the new datasets in order to determine the sub-set of atlases.

A specific example of an application of the above segmentation apparatus and method is described below in relation to brain gyrus mapping to identify more than 100 regions of the brain. There is significant anatomical variation within the brain with age, and an atlas is usually based on a single patient. Therefore for brain anatomy there can be a wide range of atlases corresponding to patients of different age or having different pathology, making atlas selection particularly important.

In this particular example, twenty eight atlas datasets are available (i.e. N=28). In this case, simply performing a full registration on all twenty eight atlases would require approximately twenty seconds per dataset, or almost ten minutes in total to register all of the twenty eight datasets.

In the present specific example, the medical image processing apparatus 30 performs registration of the image data to be segmented (e.g. the new dataset) to all twenty eight atlases using the first (limited) registration method in the form of a rigid registration.

The atlas selection unit 75 determines the mean distance between corresponding landmarks from each pair of atlases in the coordinate system of the image data to be segmented using the rigid registration method. The result in this case is a 28×28 matrix M that is symmetric about a diagonal that comprises only zero entries.

The data represented by the distance matrix M is used as the only input to the hierarchical clustering method described above, wherein the atlases having the closest mean of the distances between anatomical landmarks in the reference frame of the image data are grouped at each iteration, i.e. the atlas for adding to a cluster is selected based on the similarity of the mean distance value. The clustering continues until the cluster with the lowest mutual distance has at least a predetermined threshold number of atlases. For Gyrus segmentation, it has been found a threshold number of seven atlases gives a good balance of run time against segmentation quality. However, it will be appreciated that for other applications, the threshold number could vary.

Once the first cluster to reach the required threshold number of atlases is determined, the second registration method in the form of a non-rigid registration is then performed between the seven atlases in the selected subset (i.e. the atlases in the identified cluster). The results of the non-rigid registrations are then statistically combined to determine the final segmentation. The statistical combination of multiple registration results is known in the field of multi-atlas segmentation. Majority voting and the expectation-maximization algorithm (see, for example, Ashburner, J., & Friston, K. (1997). *Multimodal image coregistration and partitioning—a unified framework. NeuroImage*, 6(3), 209-17. doi:10.1006/nimg.1997.0290) are two statistical combination techniques that have been found to be particularly suitable. Alternatively, the STAPLE algorithm may be used in some embodiments (Warfield, S. K., Zou, K. H., & Wells, W. M. (2004). *Simultaneous Truth and Performance Level Estimation (STAPLE): An Algorithm for the Validation of Image Segmentation*, 23(7), 903-921.)

After the segmentation has been determined, annotation or highlighting can be applied to the original image data to be segmented to produce modified image data representing the segmentation, if desired.

According to embodiments of the present invention, a full registration using only a subset of selected atlases from amongst a larger set of available atlases is used, wherein the sub-set of atlases is determined using a distance metric. Specifically, anatomical landmarks are used to compute the distance metric that is used to determine the sub-set of atlases to be used. In this way, the relevant anatomy can be selected (and non-relevant anatomy ignored). Furthermore, this may result in improved selection of atlases compared to other possible selection methods such as similarity measures or heuristics.

By using clustering techniques, it may be possible to identify the most suitable atlases whilst reducing or avoiding biasing due to sample composition that can sometimes arise with other techniques such as averaging.

It will be well understood by persons of ordinary skill in the art that whilst some embodiments may implement certain functionality by means of a computer program having computer-readable instructions that are executable to perform the method of the embodiments, the computer program functionality could be implemented in hardware (for example by means of a CPU or by one or more ASICs (application specific integrated circuits)) or by a mix of hardware and software.

Whilst particular units have been described herein, in alternative embodiments, functionality of one or more of those units can be provided by a single unit, processing resource or other component, or functionality provided by a single unit can be provided by two or more units or other components in combination. Reference to a single unit encompasses multiple components, for example units, providing the functionality of that unit, whether or not such components are remote from one another, and reference to multiple units encompasses a single component, for example unit, providing the functionality of those units.

Although certain features have been described in relation to servers and/or networked storage or other devices, and certain features have been described in relation to medical image processing apparatus, it will be appreciated that one or more feature described in relation to a server, networked storage or other networked function may be provided in the medical image processing apparatus 30 and vice-versa.

Furthermore, although certain embodiments of the present invention use or comprise a server or a medical image processing apparatus, it will be appreciated that the server or processing apparatus need not be a single machine but could comprise a plurality of the relevant units, such as a distributed array.

In addition, although a rigid transformation/registration method has been described above as an example of a limited or reduced processing overhead registration method, it will be appreciated that other registration or transformation methods having low processing overhead may be used.

Furthermore, whilst hierarchical clustering is used in an example given above to select the atlases for the sub-set, it will be appreciated that other techniques such as spectral clustering or other clustering methods could be used instead.

Whilst an embodiment is described above in which the first cluster to contain a threshold number of atlases is used to identify the sub-set of atlases, it will be appreciated that other criteria could be used, such as the largest cluster for a given distance.

Certain embodiments may provide a method of selecting atlases in multi-atlas segmentation comprising performing registration over a limited parameter space between the novel and each atlas dataset, using anatomical landmarks to compute a distance metric for the registration between the novel and all possible pairs of atlases, and using the distances and a clustering method to identify the atlases to be used for refined registration.

The distance metric may be computed for an ith and jth pair of atlases by transforming landmarks into the coordinates of the novel dataset using the results of the limited registration. The metric may comprise the mean of the separation distance between corresponding landmark points. Hierarchical clustering may be used where the cluster is identified as the largest cluster for a given distance, or the first cluster to contain a given number of atlases. Spectral clustering may be used. The initial registration may comprise a rigid-body transformation. The refined registration may be non-rigid and may produce a dense deformation field.

While certain embodiments have been described, these embodiments have been presented by way of example only, and are not intended to limit the scope of the inventions. Indeed the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. A medical image data processing apparatus comprising:
a data receiver receiving image data to be segmented; and
an atlas selection processor accessing a plurality of atlas data sets and selecting a subset of the atlas data sets for use in segmenting the image data; wherein
each atlas data set comprises image data comprising a set of pixels or voxels, a plurality of predetermined anatomical landmarks, and associated data that identifies positions of the anatomical landmarks; and
the atlas selection processor configured to:
for each atlas data set, obtain a registration between the set of pixels or voxels of the atlas data set and the image data to be segmented, using a first registration method in real time;
for each atlas data set, transform the positions of the anatomical landmarks represented by the associated data, in accordance with the registration for that atlas data set of the image data to be segmented;
for each atlas data set, compute a distance between the transformed positions of the anatomical landmarks of the atlas data set in a coordinate space of the image data to he segmented and the transformed positions of anatomical landmarks for other of the atlas data sets in the coordinate space of the image data to be segmented;
perform an on-line clustering method, following the first registration method, comprising forming a plurality of clusters of the atlas data sets based on the values of the computed distances between the transformed positions of the anatomical landmarks, and select one of the clusters based on the values of the computed distances between the transformed positions of the anatomical andmarks for the clusters; and
select the atlas data sets of the selected cluster to be said subset of atlas data sets for use in segmenting the image data.

2. The image data processing method according to claim 1, wherein the atlas selection processor is configured to perform a. second registration between the subset of atlas data sets and the image data to he segmented, using a second registration method that differs from the first registration method.

3. The image data processing apparatus according to claim 2, wherein the first registration comprises a less computationally intensive registration method than that used for the second registration.

4. The image data processing apparatus according to claim 2, wherein the second registration comprises a non-rigid registration.

5. The image data processing apparatus according to claim 1, wherein the first registration comprises a rigid registration.

6. The image data processing apparatus according to claim 1, wherein the atlas selection processor is configured to calculate, for each pair of atlas data sets, a respective distance metric between the transformed landmarks of one of the pair of the atlas data sets and the transformed landmarks of the other of the pair of the atlas data sets.

7. The image data processing apparatus according to claim 1, wherein the atlas selection processor is configured to select the subset of atlas data sets by identifying atlas data sets that have the most similar distance metrics between the transformed landmarks of one of the pair of the atlas data sets and the transformed landmarks of the other of the pair of the atlas data sets.

8. The image data processing apparatus according to claim 1, wherein computing the distance metric comprises determining a mean of the distance between the transformed landmarks of one of the pair of the atlas data sets and the transformed landmarks of the other of the pair of the atlas data sets.

9. The image data processing apparatus according to claim 1, wherein for each of the atlas data sets the distance metric is computed in the coordinate system of the image data to be segmented.

10. The image data processing apparatus according to claim 1, wherein the position of the landmarks is the position of the landmarks in the coordinate system of the image data to be segmented.

11. The image data processing apparatus according to claim 1, wherein the clustering method comprises hierarchical clustering or spectral clustering.

12. The image data processing apparatus according to claim 1, wherein the clustering method comprises identifying a largest cluster for a given distance or identifying a first cluster to contain a given or preset number of the atlas data sets.

13. The image data processing apparatus according to claim 1, wherein the clustering method comprises an iterative clustering method that comprises grouping two or more atlas data sets having the most similar distance metric at each iteration.

14. The image data processing apparatus according to claim 1, wherein the atlas selection processor segments the image data using the selected subset of atlas data sets to produce segmented image data.

15. A method of image data processing comprising:
receiving image data;
accessing a plurality of atlas datasets for use in segmenting the image data; and
selecting a subset of the atlas data sets for use in segmenting the image data, wherein
each atlas data set comprises image data comprising a set of pixels or voxels, a plurality of predetermined anatomical landmarks, and associated data that identifies positions of the anatomical landmarks; and
the selecting of the subset of the atlas data sets comprises;
for each atlas data set, obtaining a registration between the set of pixels or voxels of the atlas data set and the image data to be segmented, using a first registration method in real time:
for each atlas data set, transforming the positions of the anatomical landmarks represented by the associated data, in accordance with the registration for that atlas data set of the image data to be segmented;
for each atlas data set, computing a distance between the transformed positions of the anatomical landmarks of the atlas data set in a coordinate space of the image data to be segmented and the transformed positions of anatomical landmarks for other of the atlas data sets in the coordinate space of the image data to be segmented:
performing an on-line clustering method, following the first registration method comprising forming a plurality of clusters of the atlas data sets based on the values of the computed distances between the transformed positions of the anatomical landmarks, and selecting one of the clusters based on the values of the computed distances between the transformed positions of the anatomical landmarks for the clusters; and
selecting the atlas data sets of the selected cluster to be said subset of atlas data sets for use in segmenting the image data.

16. A non-transitory computer readable medium comprising a computer program product storing computer-readable instructions that are executable to perform a method according to claim 15.

* * * * *